United States Patent
Gupta (10) Patent No.: US 11,218,846 B2
(45) Date of Patent: Jan. 4, 2022

(54) METHOD FOR MANAGING FLOOR REQUEST IN MISSION CRITICAL COMMUNICATION SYSTEM

(71) Applicant: Samsung Electronics Co., Ltd, Suwon-si (KR)

(72) Inventor: Nishant Gupta, Uttar Pradesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/328,491

(22) PCT Filed: Aug. 28, 2017

(86) PCT No.: PCT/KR2017/009358
§ 371 (c)(1),
(2) Date: Feb. 26, 2019

(87) PCT Pub. No.: WO2018/038581
PCT Pub. Date: Mar. 1, 2018

(65) Prior Publication Data
US 2019/0200176 A1 Jun. 27, 2019

(30) Foreign Application Priority Data

Aug. 26, 2016 (IN) .............................. 201641029174
Aug. 14, 2017 (IN) .............................. 201641029174

(51) Int. Cl.
*H04W 4/10* (2009.01)
*H04W 4/08* (2009.01)
(Continued)

(52) U.S. Cl.
CPC ........... *H04W 4/10* (2013.01); *H04L 65/4038* (2013.01); *H04L 65/4061* (2013.01); *H04W 4/08* (2013.01); *H04W 76/45* (2018.02); *H04W 88/18* (2013.01)

(58) Field of Classification Search
CPC ......... H04W 4/10; H04W 4/08; H04W 76/45; H04W 88/18; H04W 88/182; H04W 72/1247; H04L 65/4038; H04L 65/4061
See application file for complete search history.

(56) References Cited

U.S. PATENT DOCUMENTS

| | | | | |
|---|---|---|---|---|
| 7,983,199 B1 * | 7/2011 | Nguyen | .............. | H04L 65/4038 370/260 |
| 2002/0077136 A1 * | 6/2002 | Maggenti | ............ | H04L 63/0428 455/518 |
| 2009/0137263 A1 * | 5/2009 | Abbate | .................. | H04W 76/45 455/518 |

FOREIGN PATENT DOCUMENTS

| | | |
|---|---|---|
| CN | 101075988 A | 11/2007 |
| CN | 101132562 A | 2/2008 |
| | (Continued) | |

OTHER PUBLICATIONS

3GPP TS 24.380 V13.1.Jun. 1, 2016 Mission Critical PTT (MCPTT) media plane control (Year: 2016).*

(Continued)

*Primary Examiner* — Dong-Chang Shiue (57) ABSTRACT

Embodiments herein provide a method for managing a floor request in a mission critical communication system. The method includes receiving a floor request message from a first floor participant and determining that a call type of the first floor participant is identical to a call type of a second floor participant, wherein a floor is currently occupied by the second floor participant. Further, the method includes managing the floor request of the first floor participant based on an effective priority of the floor request.

8 Claims, 7 Drawing Sheets

(51) Int. Cl.
*H04W 88/18* (2009.01)
*H04W 76/45* (2018.01)
*H04L 29/06* (2006.01)

(56) References Cited

FOREIGN PATENT DOCUMENTS

| | | |
|---|---|---|
| CN | 101150786 A | 3/2008 |
| KR | 10-2016-0002150 A | 1/2016 |

OTHER PUBLICATIONS

3GPP TS 24.380 V13.1. Jun. 1, 2016 Mission Critical PTT (MCPTT) media plane control (Year: 2016) (Year: 2016).*

"3rd Generation Partnership Project; Technical Specification Group Core Network and Terminals Mission Critical Push to Talk (MCPTT) media plane control; Protocol specification (Release 13)", 3GPP TS 24.380 V13.1.1 (Jun. 2016), 218 pages.

"3rd Generation Partnership Project; Technical Specification Group Core Network and Terminals Mission Critical Push to Talk (MCPTT) media plane control; Protocol specification (Release 14)", 3GPP TS 24.380 V14.1.0 (Dec. 2016), 240 pages.

International Search Report dated Dec. 28, 2017 in connection with International Patent Application No. PCT/KR2017/009358, 4 pages.

Office Action dated Dec. 17, 2020 in connection with Chinese Patent Application No. 201780052523.2, 40 pages.

* cited by examiner

METHOD FOR MANAGING FLOOR REQUEST IN MISSION CRITICAL COMMUNICATION SYSTEM

CROSS-REFERENCE TO RELATED APPLICATIONS

The application is a 371 of International Patent Application No. PCT/KR2017/009358 filed on Aug. 28, 2017, which claims priority to India Patent Application No. 201641029174 filed on Aug. 26, 2016 and India Patent Application No. 201641029174 filed on Aug. 14, 2017, the disclosures of which are herein incorporated by reference in their entirety.

BACKGROUND

Embodiments herein relate to mission critical communication system, and more particularly to methods for managing floor request in mission critical communication system.

1. FIELD

A Push To Talk service provides an arbitrated method by which two or more users may engage in communication. Users may request permission to transmit (e.g., traditionally by means of a press of a button). The Mission Critical Push To Talk over LTE (MCPTT) service supports an enhanced PTT service, suitable for mission critical scenarios, based upon 3GPP Evolved Packet System (EPS) services.

2. DESCRIPTION OF RELATED ART

The MCPTT Service is intended to support communication between several users (a group call), where each user has the ability to gain access to the permission to talk in an arbitrated manner. The MCPTT Service builds on the existing 3GPP transport communication mechanisms provided by the EPS architectures to establish, maintain, and terminate the actual communication path(s) among the users.

The MCPTT Service also builds upon ProSe (Proximity-based Service) service enabler for off-network communications. While operating in off-network mode the MCPTT service uses a ProSe E-UTRA direct (UE-to-UE) Communication path (ProSe direct communication path) for transport. The ProSe direct communication path does not traverse the network infrastructure.

MCPTT employs a floor control mechanism for the MCPTT calls. In general, the MCPTT during usual operations, only one user is expected to transmit media. For e.g., to transmit media, an MCPTT user may request for floor transmission permission from the floor arbitrator or the floor control server. If the floor is available for transmission, the floor control server grants the permission to the requesting user. But, in-case the floor is already occupied by another MCPTT user and is not immediately available for transmission, the MCPTT server has 3 viable options: 1. Deny the floor request, 2. Queue the floor request and later grant when possible, or 3. Override the current occupant of the floor and grant permission to the requesting user.

For option 3, the floor arbitrator or the floor control server, needs to determine the priority and override capability of the floor request. Conventionally, there are techniques associated with the MCPTT call type, MCPTT user and the floor request that can play a role in determining the floor request priority and override capability of the floor request. However, these techniques fails to consider the priority of the current occupant prior to granting permission to the requesting user.

The above information is presented as background information only to help the reader to understand the present invention. Applicants have made no determination and make no assertion as to whether any of the above might be applicable as prior art with regard to the present application.

SUMMARY

The principal object of the embodiments herein is to provide a method for managing a floor request in a mission critical communication system.

Another object of the embodiments herein is to provide a method to determine the effective priority of the floor requests based on a user priority, a participant type and a floor priority.

Another object of the embodiments herein is to provide a method for managing, the floor request of the first floor participant based on an effective priority.

Another object of the embodiments herein is to provide a method for managing a floor request from a first floor participant in a mission critical communication system when the call type of the first floor participant is identical to the call type of the second floor participant, wherein the second floor participant is the current occupant of the floor.

Methods for managing floor request in mission critical communication system are provided.

A method includes receiving a floor request message from a first floor participant and determining that a call type of the first floor participant is identical to a call type of a second floor participant, wherein a floor is currently occupied by the second floor participant. Further, the method includes managing the floor request of the first floor participant based on an effective priority of the floor request.

According to various exemplary embodiments, an image display apparatus may determine the effective priority of the floor requests based on a user priority, a participant type and a floor priority.

According to various exemplary embodiments, an image display apparatus may manage the floor request of the first floor participant based on an effective priority.

According to various exemplary embodiments, an image display apparatus may manage a floor request from a first floor participant in a mission critical communication system when the call type of the first floor participant is identical to the call type of the second floor participant, wherein the second floor participant is the current occupant of the floor.

BRIEF DESCRIPTION OF THE DRAWINGS

The embodiments herein will be better understood from the following detailed description with reference to the drawings, in which.

DETAILED DESCRIPTION

Embodiments herein provide a method for managing a floor request in a mission critical communication system. The method includes receiving a floor request message from a first floor participant, determining that a call type of the first floor participant is identical to a call type of a second floor participant, wherein a floor is currently occupied by the second floor participant, and managing the floor request of the first floor participant based on an effective priority of the floor request.

In an embodiment, the method for managing the floor request of the first floor participant based on the effective priority of the floor request message includes determining whether the user priority for the first floor participant and the second floor participant are available, and determining at least one of the participant type and the floor priority for the first floor participant and the second floor participant, in response to determining that the user priority for the first floor participant and the second floor participants are unavailable.

In an embodiment, the method for managing the floor request of the first floor participant based on the effective priority of the floor request includes determining whether the user priority for the first floor participant and the second floor participant is available and determining that the user priority for the first floor participant is greater than the second floor participant in response to determining that the user priority for both the first floor participant and the second floor participant is available. Further, the method includes managing the floor request of the first floor participant by overriding the floor occupied by the second floor participant in response to determining that the user priority for the first floor participant is greater than the second floor participant, and granting the floor request to the first floor participant in response to overriding the floor occupied by the second floor participant.

Further, the method also includes determining that the user priority of the second floor participant is greater than the user priority of the first floor participant and managing the floor request by performing one of queuing the floor request and denying the floor request.

Furthermore, the method also includes determining that the user priorities of the first floor participant and the second floor participant is same and detecting at least one of participant type and the floor priority for the first floor participant and the second floor participant.

In an embodiment, the method for managing the floor request of the first floor participant based on the effective priority of the floor request message includes determining whether the participant type for both the first floor participant and the second floor participant is available, and determining at least one of the user priority and the floor priority for the first floor participant and the second floor participant in response to determining that the participant type for both the first floor participant and the second floor participant is unavailable.

In an embodiment, the method for managing the floor request of the first floor participant based on the effective priority of the floor request message includes determining whether the participant type for the first floor participant and the second floor participant is available. Further, the method includes determining that the participant type is only available for the first floor participant and managing the floor request of the first floor participant by: overriding the floor occupied by the second floor participant in response to determining that the participant type is only available for the first floor participant, and granting the floor request to the first floor participant in response to overriding the floor occupied by the second floor participant. Further, the method also includes determining that the participant type is only available for the second floor participant and managing the floor request by performing one of queuing the floor request and denying the floor request. Further, the method also includes determining that the participant type for both the first floor participant and the second floor participant is available and determining a precedence of the first floor participant and the second floor.

In an embodiment, the method for determining the precedence of the first floor participant and the second floor participant includes detecting that the first floor participant precedes the second floor participant and managing the floor request message of the first floor participant by: overriding the floor occupied by the second floor participant in response to detecting that the first floor participant precedes the second floor participant, and granting the floor to the first floor participant in response to overriding the floor occupied by the second floor participant.

In an embodiment, the method for determining the precedence of the first floor participant and the second floor participant includes detecting that the second floor participant precedes the first floor participant and managing the floor request by performing one of queuing the floor request and denying the floor request.

In an embodiment, the method for determining the precedence of the first floor participant and the second floor participant includes detecting that the precedence of the first floor participant and the second floor participant is same and continuously monitoring to determine the user priority and the floor priority information associated with each of the first floor participant and the second floor participant.

In an embodiment, the method for managing the floor request of the first floor participant based on the effective priority of the floor request message includes determining whether the floor priority is available for both the first floor participant and the second floor participant. In response to detecting that the floor priority is available for both the first floor participant and the second floor participant, the method includes determining whether the floor priority of the first floor participant is greater than the floor priority of the second floor participant. Further, the method includes managing the floor request of the first floor participant by: overriding the floor occupied by the second floor participant in response to detecting that the floor priority of the first floor participant is greater than the second floor participant and granting the floor to the first floor participant in response to overriding the floor occupied by the second floor participant. Furthermore, the method includes detecting that the floor priority of the second floor participant is greater than the first floor participant and denying the floor request in response to detecting that the floor priority of the second floor participant is greater than the floor priority of the first floor participant.

In an embodiment, the method for managing the floor request of the first floor participant based on the effective priority of the floor request message includes determining the effective priority, i.e. minimum of available priority parameters such as participant type, user priority and floor priority for both the first floor participant and the second floor participant. Further, the method includes managing the floor request of the first floor participant by overriding the floor occupied by the second floor participant in response to determining that the effective priority of the first floor participant is greater than the effective priority of the second floor participant, and granting the floor request to the first floor participant in response to overriding the floor occupied by the second floor participant. Further, the method also includes determining that the effective priority is greater for the second floor participant than the first floor participant or greater for the second floor participant than the first floor participant and denying the floor request message of the first floor participant if queuing is disabled or queuing the floor request of the first floor participant if queuing is enabled.

Accordingly, embodiments herein provide a floor control server for managing a floor request in a mission critical communication system. The floor control server includes a memory and a processor configured to receive a floor request message from a first floor participant and determine that the call type of the first floor participant is identical to the call type of the second floor participant, wherein the floor is currently occupied by the second floor participant, and manage the floor request of the first floor participant based on the effective priority of the floor request, wherein the effective priority is determined based on at least one of user priority, participant type and floor priority.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "first" and "second" herein are used merely for labeling purpose and can be used interchangeably without departing from the scope of the embodiments.

The embodiments herein are adopted in 3GPP TS 24.380: Mission Critical Push To Talk (MCPTT) media plane control (rel-13 and rel-14); "4.1.1.5 Determine off-network effective priority", "7.2.1.2 Determine off-network floor priority".

Accordingly the embodiments herein provide a method and system for managing a floor request in a mission critical communication system. The method includes receiving a floor request message from a first floor participant and determining that a call type of the first floor participant is identical to a call type of a second floor participant, wherein a floor is currently occupied by the second floor participant. Further, the method includes managing the floor request of the first floor participant based on an effective priority of the floor request message.

The proposed method allows the floor control server to manage the floor based on the effective priority of the user currently occupied with the floor and the effective priority of the second floor participant indicated in the floor request message.

Referring now to the drawings, and more particularly to FIGS. 1 through 8, where similar reference characters denote corresponding features consistently throughout the figures, there are shown preferred embodiments.

Figure 1:
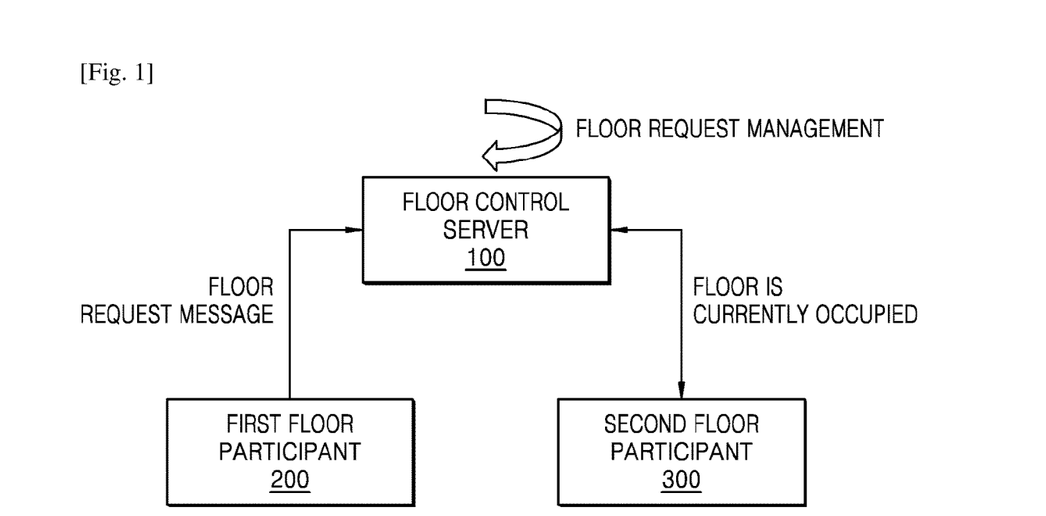
FIG. 1 illustrates an architecture of a mission critical communication system for managing a floor request, according to an embodiment as disclosed herein.

FIG. 1 illustrates an architecture of a mission critical communication system 1000 for managing the floor request, according to an embodiment as disclosed herein. The mission critical communication system 1000 employs a floor control mechanism for managing the transmission of media i.e., MCPTT calls.

The mission critical communication system 1000 includes a floor control server 100, a first floor participant 200 and a second floor participant 300.

In an embodiment, the first floor participant 200 and the second floor participant 300 can be for e.g., an electronic device, a User Equipment (UE), and the like.

In an embodiment the first floor participant 200 and the second floor participant 300 communicates with the floor control server 100 using one or more wireless network resources (5G, LTE, 3GPP).

Referring to FIG. 1, the floor control server 100 is configured to receive the floor request message from the first floor participant 200 requesting to grant the floor. Further, the floor control server 100, upon receiving the floor request message, determines that the floor is already occupied by the second floor participant 300 and is not immediately available for transmission.

Furthermore, the floor control server 100 is configured to perform floor request management which includes multiple options as described below:

1. Deny the floor request,
2. Queue the floor request and later grant when possible, and
3. Override the second floor participant 300 and grant the floor to the first floor participant 200.

In order to perform the option 3, the floor control server 100 can be configured to determine the priorities of both the first floor participant 200 and the second floor participant 300, and manage the floor request message accordingly. Accordingly, the proposed method can be used to determine the effective priority of both the first floor participant 200 and the second floor participant 300 based on multiple attributes associated with the mission critical communication system.

The attributes considered to determine the effective priority of the floor request are:

1. Call type, an attribute of the ongoing call.
2. User priority, an attribute of the User.
3. Participant type, an attribute of the User.
4. Floor priority, an attribute of the Floor request.

Figure 2:
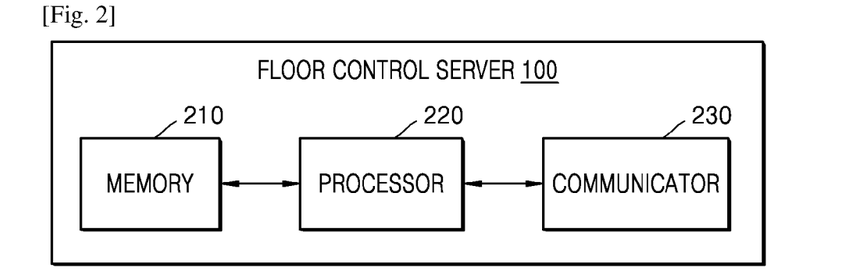
FIG. 2 is a block diagram of a structure of a floor control server, according to an embodiment as disclosed herein.

FIG. 2 is a block diagram of a structure of a floor control server 100, according to an embodiment as disclosed herein.

Referring to FIG. 2, the floor control server 100 may include a memory 210, a processor 220, and a communicator 230.

In an embodiment, the memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory 210 is non-movable. In some examples, the memory 210 may be configured to store larger amounts of information than the memory. In certain examples, a non-transitory storage medium may store data that can, over time, change (e.g., in Random Access Memory (RAM) or cache). In addition, the memory 210 may include storage locations configured to be addressable through the processor 220.

In an embodiment, the communicator 230 can be configured to receive the floor request message from the first floor participant 200, when the floor is currently occupied by the second floor participant 300.

The processor 220 (for example; a hardware unit, an apparatus, a Central Processing Unit (CPU), a Graphics Processing Unit (GPU), etc.,) may be communicatively coupled to a memory 210.

In an embodiment, the processor 220 may be configured to determine that the call type of the first floor participant 200 is identical to call type of the second floor participant 300. Further, the processor 220 may be configured to manage the floor request of the first floor participant 200 based on the effective priority of the floor request (e.g., floor request message). The effective priority of the floor request is determined based on the attributes such as the user priority (as detailed in FIG. 5), the participant type (as detailed in FIG. 6) and the floor priority (as detailed in FIG. 7).

Figure 3:
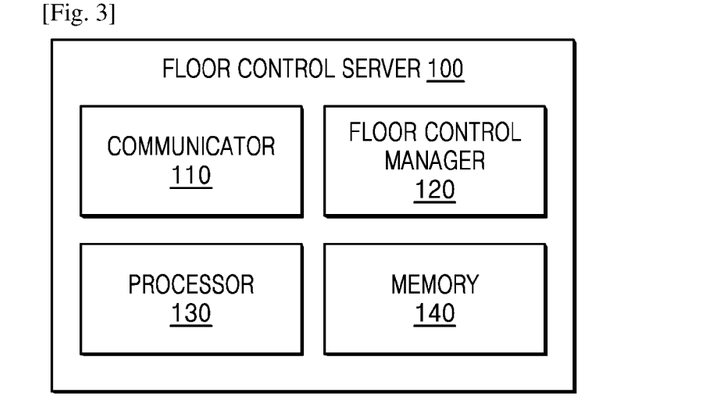
FIG. 3 is a block diagram illustrating various units of a floor control server, according to another embodiment as disclosed herein.

FIG. 3 is a block diagram illustrating various units of a floor control server 100, according to another embodiment as disclosed herein.

Referring to FIG. 3, the floor control server 100 can include a communicator 110, a floor control manager 120, a processor 130 and a memory 140.

In an embodiment, the communicator 110 can include the communicator 230 described in FIG. 2. The communicator 110 can be configured to receive the floor request message from the first floor participant 200, when the floor is currently occupied by the second floor participant 300.

In an embodiment, the floor control manager 120 can be configured to determine that the call type of the first floor participant 200 is identical to call type of the second floor participant 300. Further, the floor control manager 120 can be configured to manage the floor request of the first floor participant 200 based on the effective priority of the floor request (e.g., floor request message). The effective priority of the floor request is determined based on the attributes such as the user priority (as detailed in FIG. 5), the participant type (as detailed in FIG. 6) and the floor priority (as detailed in FIG. 7).

The processor 130 (for example; a hardware unit, an apparatus, a Central Processing Unit (CPU), a Graphics Processing Unit (GPU), etc.,) communicatively coupled to a memory 140 (e.g., a volatile memory and/or a non-volatile memory); the memory 140 includes storage locations configured to be addressable through the processor 130. In addition, as described in FIG. 2, the floor control manager 120 and the processor 130 can be integrated into one hardware processor.

In an embodiment, the memory 140 may include the memory 210 described in FIG. 2. In FIG. 3, matters of the communicator 110 and the memory 140 that are the same as the described above with reference to FIG. 2 are not redundantly described.

Figure 4:
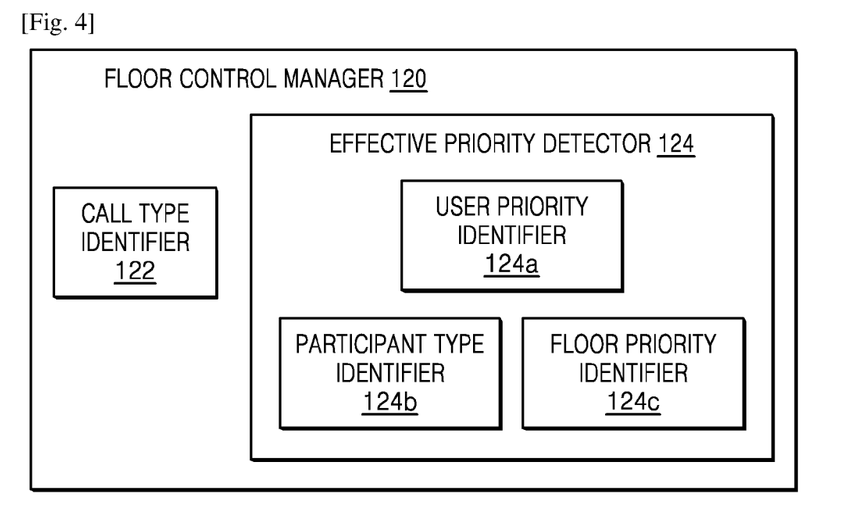
FIG. 4 is a block diagram illustrating various units of a floor control manager, according to an embodiment as disclosed herein.

FIG. 4 is a block diagram illustrating various units of a floor control manager 120, according to an embodiment as disclosed herein.

Referring to FIG. 4, the floor control manager 120 can include a call type identifier 122 and an effective priority detector 124.

In an embodiment, the call type identifier 122 can be configured to determine that the call type indicated in the floor request message of the first floor participant 200 and the call type (i.e., current call type) of the second floor participant 300 is identical. There are multiple possible call types. In an embodiment, the following three types of calls are considered: Emergency call, Imminent Peril call and Basic call (or, Normal call).

Imminent Peril: An urgent MCPTT group call that highlights the potential of death or serious injury, but is less critical than an MCPTT Emergency Call. For example, a call prioritized in the event of immediate threat to any human life such as resulting from the MCPTT User's observation of or engagement in a situation involving imminent peril to the general public (e.g., a forest fire about to encircle campers, a tanker truck ready to explode near a school, casualties at the scene of a car bombing).

Emergency Call: An urgent MCPTT group call that highlights a grave situation like, death or serious injury. It is the most critical MCPTT call.

Effective Priority: The priority decision determined by the floor control server 100 based on multiple input parameters like floor priority, participant type, type of call etc. of the current floor request and of the current participant to which floor is granted if any and the local policy.

In an embodiment, the effective priority detector 124 may include a user priority identifier 124a, a participant type identifier 124b and a floor priority identifier 124c.

In an embodiment, the user priority identifier 124a is configured to determine the user priority of the first floor participant 200 and the second floor participant 300 which includes:

1. Determining the availability of the user priority for both the first floor participant 200 and the second floor participant 300:
   a. If user priority is not available for both the first floor participant 200 and the second floor participant 300, the effective priority detector 124 can be configured to detect the participant type and floor priority of the first floor participant 200 and the second floor participant 300.
   b. If user priority is available only for the second floor participant 300, the effective priority detector 124, queues the floor request from the first floor participant 200 if queuing is enabled or denies the floor request if queuing is not enabled.
   c. If user priority is available only for the first floor participant 200, the effective priority detector 124, overrides the second floor participant 300 and grants the floor request.
   d. If user priority is available for both, the first floor participant 200 and the second floor participant 300, the effective priority detector 124, compares the user priorities of the first floor participant 200 and the second floor participant 300:
     1) If user priority of the second floor participant 300 is higher than the effective priority of the first floor participant 200, the effective priority detector 124, queues the floor request from the first floor participant 200 if queuing is enabled or denies the floor request if queuing is not enabled.
     2) If user priority of the first floor participant 200 is higher than the effective priority of the second floor participant 300, the effective priority detector 124, overrides the second floor participant 300 and grants the floor request.
     3) If user priority of both, the first floor participant 200 and the second floor participant 300 are same, then the effective priority detector 124 can be configured to detect the participant type and floor priority.

In an embodiment, the participant type identifier 124b is configured to determine if the participant type is available for the first floor participant 200 and the second floor participant 300 which includes:

1. Determining, by the effective priority detector 124, the availability of the participant type for at least one of the first floor participant 200 and the second floor participant 300:
   a. If the participant type is not available for at least one of the first floor participant 200 and the second floor participant 300, the effective priority detector 124, can be configured to detect the user priority and floor priority.
   b. If the participant type is available for at least one of the first floor participant 200 and the second floor participant 300:
     1) The effective priority detector 124 determines the availability of participant type for both the first floor participant 200 and the second floor participant 300:
       A. If participant type is available only for the second floor participant 300, the effective priority detector 124 queues the floor request if queuing is enabled or denies the floor request if queuing is not enabled.
       B. If participant type is available only for the first floor participant 200, the effective priority detector 124 overrides the second floor participant 300 and grants the floor request.
       C. If participant type is available for both, first floor participant 200 and the second floor participant 300, the effective priority detector 124:
         a. Checks the precedence of the second floor participant 300 and the first floor participant 200 in the participant type:
           (1) If the second floor participant 300 precedes the first floor participant 200, the effective priority detector 124 queues the floor request if queuing is enabled or denies the floor request if queuing is not enabled.
           (2) If the first floor participant 200 precedes the second floor participant 300, the effective priority detector 124 overrides the first floor participant 200 and grants the floor request.
           (3) If the first floor participant 200 and the second floor participant 300 are of the same level, the effective priority detector 124 can be configured to detect the user priority and floor priority.

In an embodiment, the floor priority identifier 124c of the effective priority detector 124 is configured to determine the floor priority of the first floor participant 200 and the second floor participant 300, which includes:

1. Determining the presence of floor priority in the floor request message sent the by first floor participant 200:
   a. If the floor priority is not present, the floor control manager 120 queues the floor request message if queuing is enabled, or denies the floor request if queuing is not enabled
   b. If the floor priority is present, the effective priority detector 124 can be configured to compare the floor priority of the first floor participant 200 and the floor priority of the second floor participant 300:
     1) If the floor priority of the second floor participant 300 is higher than the floor priority of the first floor participant 200, the floor control manager 120 queues the floor request of the first floor participant 200 if queuing is enabled or denies the floor request if queuing is not enabled.
     2) If the floor priority of the first floor participant 200 is higher than the floor priority of the second floor participant 300, the floor control manager 120 overrides the second floor participant 300 and grants the floor to the first floor participant 200.

Figure 5:
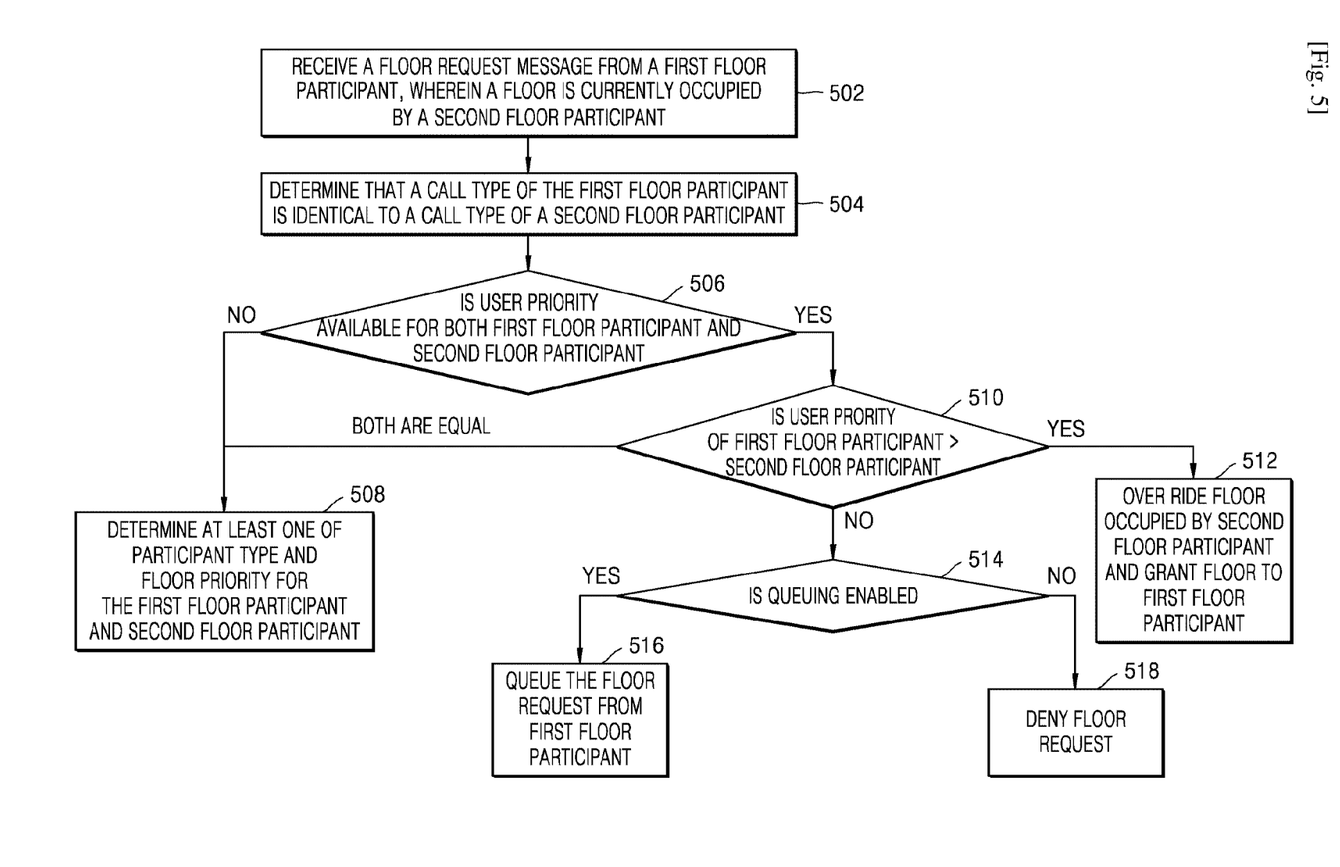
FIG. 5 is a flow diagram for managing a floor request in the mission critical communication system based on a user priority, according to an embodiment as disclosed herein.

FIG. 5 is a flow diagram for managing the floor request in the mission critical communication system based on the user priority, according to an embodiment as disclosed herein.

Referring to FIG. 5, at step 502, the floor control server 100 receives the floor request message from the first floor participant 200. For example, in the floor control server 100 as illustrated in the FIG. 2, the communicator 230 can be configured to receive the floor request message from the first floor participant 200.

At step 504, the floor control server 100 determines that the call type of the first floor participant 200 is identical to the call type of the second floor participant 300, where the floor is currently occupied by the second floor participant 300. For example, in the floor control server 100 as illustrated in the FIG. 2, the processor 220 can be configured to determine that the call type of the first floor participant 200 is identical to the call type of the second floor participant 300.

At step 506, the floor control server 100 determines whether the user priority is available for both the first floor participant 200 and the second floor participant 300. On determining that the user priority is not available for both the first floor participant 200 and the second floor participant 300, at step 508, the floor control server 100 can be configured to detect the participant type and the floor priority information associated with the first floor participant 200 and the second floor participant 300.

On determining that the user priority for the first floor participant 200 and the second floor participant 300 is available, at step 510, the floor control server 100 determines whether the user priority of the first floor participant 200 is greater than the user priority of the second floor participant 300. On determining that the user priority for the first floor participant 200 and the second floor participant 300 are the same, the floor control server 100, at step 508, determines at least one of participant type and floor priority for the first floor participant 200 and the second floor participant 300.

On determining that the user priority of the first floor participant 200 is greater than the user priority of the second floor participant 300, the floor control server 100, at step 512, over rides the floor occupied by the second floor participant 300 and grants the floor to the first floor participant 200. On determining that the user priority for the first floor participant 200 is not greater than the second floor participant 300, the floor control server 100, at step 514, determines whether queuing is enabled. On determining that queuing is enabled at, at step 516, the floor control server 100 queues the floor request received from first floor participant 200. On determining that queuing is not enabled at, at step 518, the floor control server 100 denies the floor request of the first floor participant 200.

Figure 6:
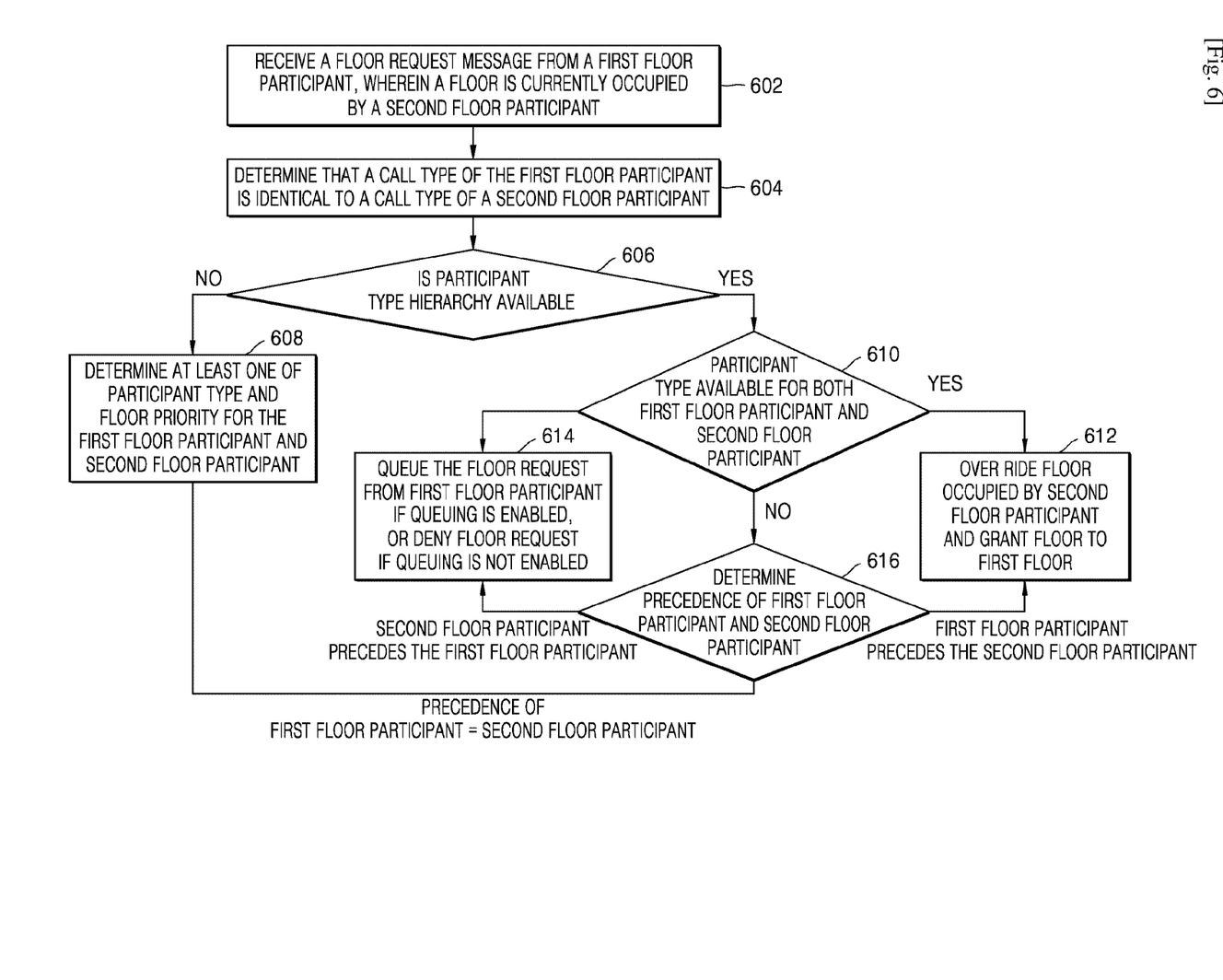
FIG. 6 is a flow diagram for managing a floor request in the mission critical communication system based on a participant type, according to an embodiment as disclosed herein.

FIG. 6 is a flow diagram for managing the floor request in the mission critical communication system based on the participant type, according to an embodiment as disclosed herein.

Referring to FIG. 6, at step 602, the floor control server 100 receives the floor request message from the first floor participant 200. For example, in the floor control server 100 as illustrated in the FIG. 2, the communicator 230 can be configured to receive the floor request message from the first floor participant 200.

At step 604, the floor control server 100 determines that the call type of the first floor participant 200 is identical to the call type of the second floor participant 300. For example, in the floor control server 100 as illustrated in the FIG. 2, the processor 220 can be configured to determine that the call type of the first floor participant 200 is identical to the call type of the second floor participant 300. In an embodiment, the floor is currently occupied by the second floor participant 300.

At step 606, the floor control server 100 determines whether the participant type hierarchy is available for at least one of the first floor participant 200 and the second floor participant 300. On determining that the participant type hierarchy is not available for at least one of the first floor participant 200 and the second floor participant 300, the floor control server 100, at step 608, can be configured to detect the user priority and the floor priority information associated with the first floor participant 200 and second floor participant 300.

On determining that the participant type hierarchy is available for at least one of the first floor participant 200 and the second floor participant 300, the floor control server 100, at step 610, determines if the participant type hierarchy is available for both the first floor participant 200 and the second floor participant 300. On determining that the participant type is available only for the second floor participant 300, the floor control server 100, at step 614 queues the floor request received from the first floor participant 200 if queuing is enabled, or denies the floor request received from the first floor participant 200 if queuing is not enabled. On determining that the participant type hierarchy is available only for the first floor participant 200, the floor control server 100, at step 612 over rides the floor occupied by the second floor participant 300 and grants the floor to first floor participant 200.

On determining that the participant type hierarchy is available for both the first floor participant 200 and the second floor participant 300, the floor control server 100, at step 616, determines the precedence of the first floor participant 200 and the second floor participant 300. On determining that the second floor participant 300 precedes the first floor participant 200, the floor control server 100, at step 614, queues the floor request received from the first floor participant 200 if queuing is enabled, or denies floor request received from the first floor participant 200 if queuing is not enabled. On determining that the first floor participant 200 precedes the second floor participant 300, the floor control server 100, at step 612, overrides the floor occupied by the second floor participant 300 and grants the floor to the first floor participant 200.

On determining that the precedence of the first floor participant 200 and the second floor participant 300 are the same, the floor control server 100, at step 608, can be configured to detect the user priority and the floor priority information associated with the first floor participant 200 and the second floor participant 300.

Figure 7:
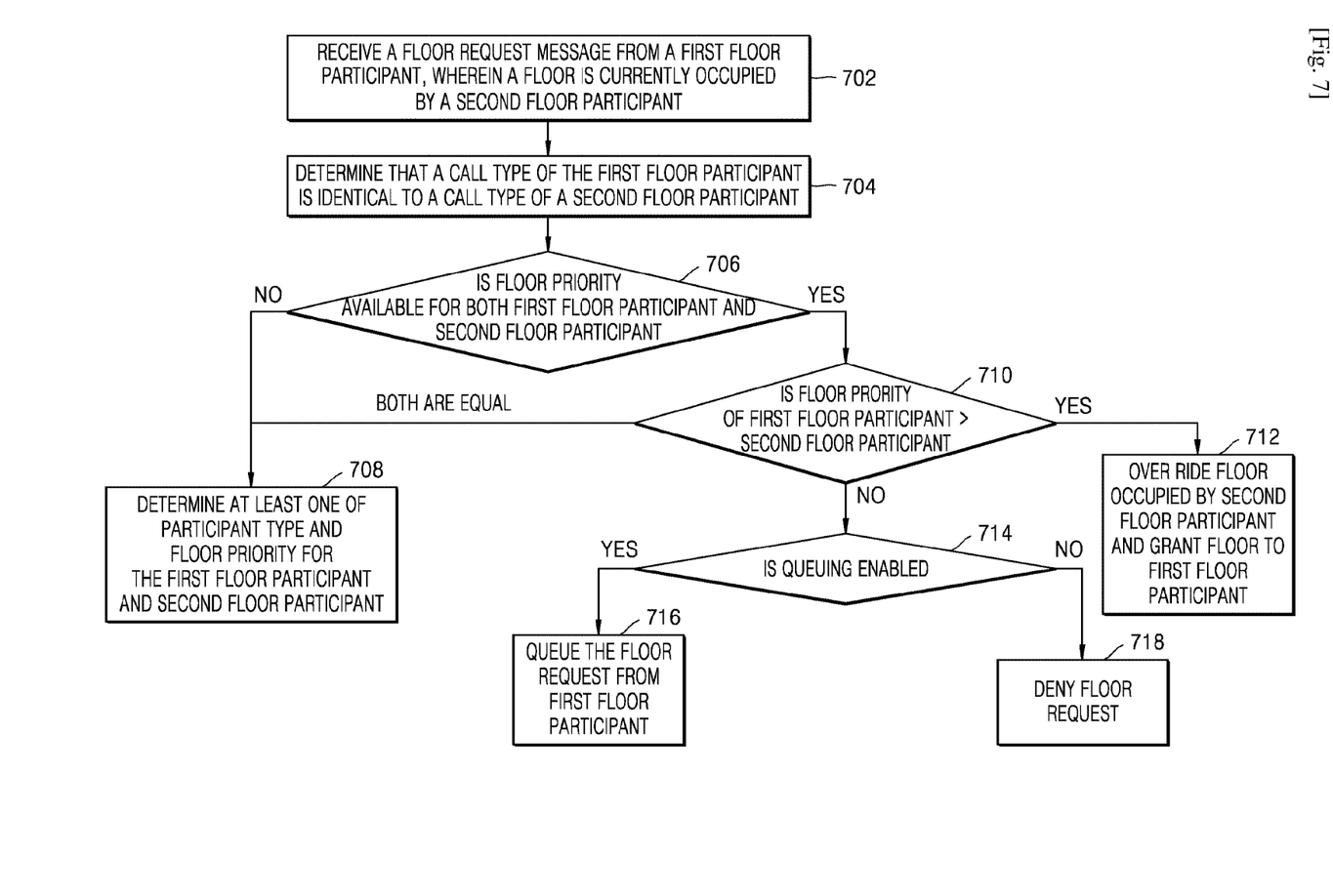
FIG. 7 is a flow diagram for managing a floor request in the mission critical communication system based on a floor priority, according to an embodiment as disclosed herein.

FIG. 7 is a flow diagram for managing the floor request in the mission critical communication system based on the floor priority, according to an embodiment as disclosed herein.

Referring to FIG. 7, at step 702, the floor control server 100 receives the floor request message from the first floor participant 200. For example, in the floor control server 100 as illustrated in the FIG. 2, the communicator 230 can be configured to receive the floor request message from the first floor participant 200.

At step 704, the floor control server 100 determines that the call type of the first floor participant 200 is identical to the call type of the second floor participant 300. For example, in the floor control server 100 as illustrated in the FIG. 2, the processor 220 can be configured to determine that the call type of the first floor participant 200 is identical to the call type of the second floor participant 300.

At step 706, the floor control server 100 determines whether the floor priority is available for both the first floor participant 200 and the second floor participant 300. On determining that the user priority is not available for both the first floor participant 200 and the second floor participant 300, at step 708, the floor control server 100 can be configured to detect the user priority and the participant type information associated with the first floor participant 200 and second floor participant 300.

On determining that the floor priority for the first floor participant 200 and the second floor participant 300 is available, at step 710, the floor control server 100 determines whether the floor priority of the first floor participant 200 is greater than the floor priority of the second floor participant 300. On determining that the floor priority for the first floor participant 200 is same as the floor priority of the second floor participant 300, the floor control server 100, at step 708, can be configured to detect the user priority and the participant type information associated with the first floor participant 200 and second floor participant 300.

On determining that the floor priority of the first floor participant 200 is greater than the floor priority of the second floor participant 300, the floor control server 100, at step 712, overrides the floor occupied by the second floor participant 300 and grants the floor to the first floor participant 200. On determining that the floor priority of the first floor participant 200 is not greater than the floor priority of the second floor participant 300, the floor control server 100, at step 714, determines whether queuing is enabled. On determining that queuing is enabled, at step 716, the floor control server 100 queues the floor request from first floor participant 200. On determining that queuing is not enabled at, at step 718, the floor control server 100 denies the floor request of the first floor participant 200.

Figure 8A:
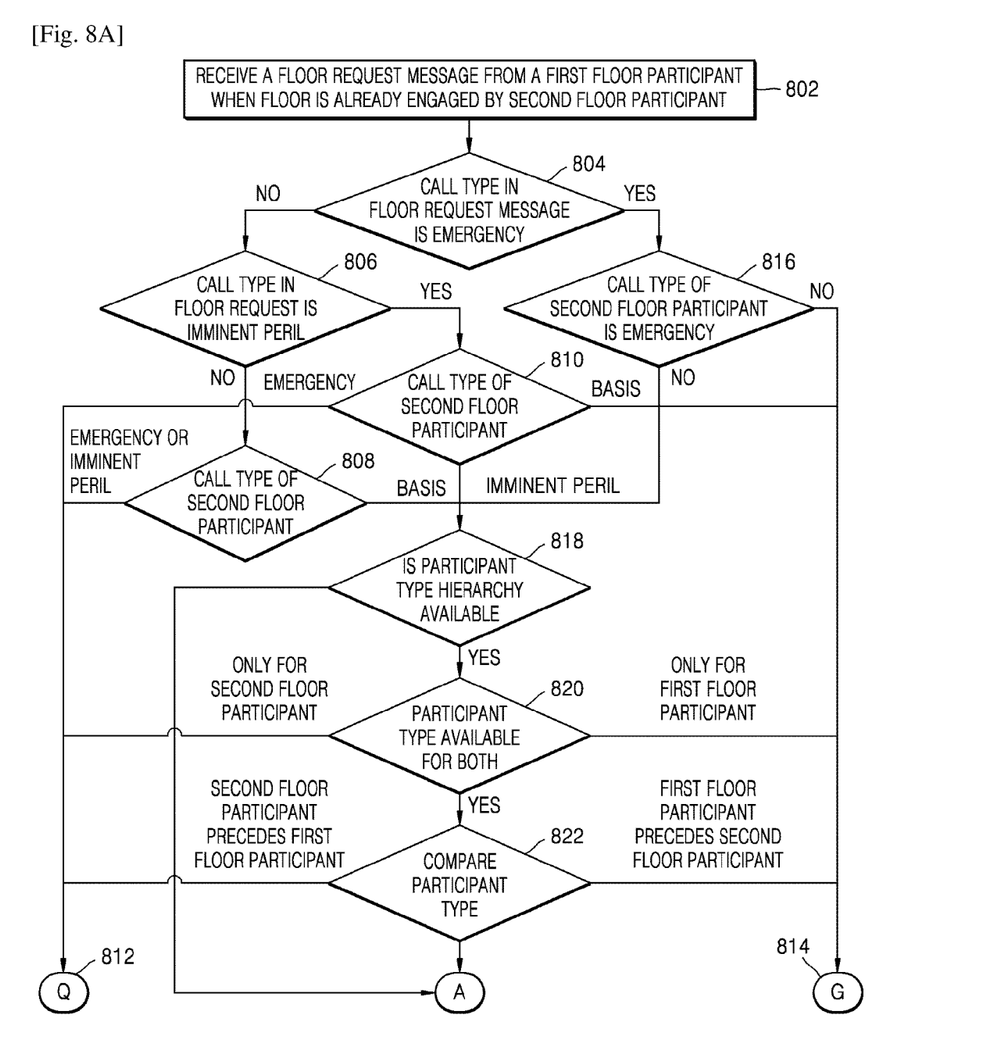
FIGS. 8A and 8B are flow diagrams for managing a floor request in the mission critical communication system using the user priority, the participant type and the floor priority, according to an embodiment as disclosed herein.
Figure 8B:
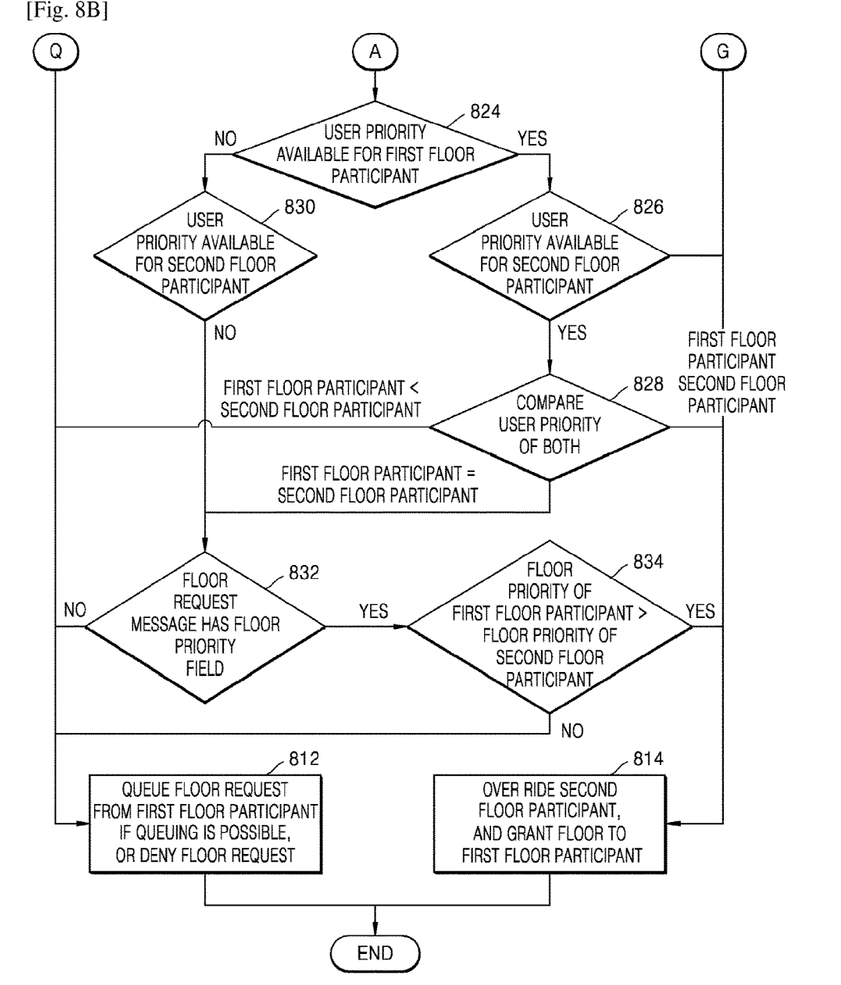

FIGS. 8A and 8B are flow diagrams for managing the floor request in the mission critical communication system using user priority, participant type and floor priority, according to an embodiment as disclosed herein.

Referring to FIG. 8A, the various attributes and the precedence order of the different attributes that can be used in determining the effective priority of the floor request are provided.

At step 802, the floor control server 100 receives a floor request message from the first floor participant 200. For example, in the floor control server 100 as illustrated in the FIG. 2, the communicator 230 can be configured to receive the floor request message from the first floor participant 200.

At step 804, the floor control server 100 determines whether the call type indicated in the floor request message sent by the first floor participant 200 is emergency. For example, in the floor control server 100 as illustrated in the FIG. 2, the processor 220 can be configured to determine whether the call type indicated in the floor request message sent by the first floor participant 200 is emergency.

On determining that the call type indicated in the floor request message is not emergency, at step 806, the floor control server 100 determines if the call type indicated in the floor request message is imminent peril. On determining that the call type in the floor request message is not imminent peril, at step 808, the floor control server 100 determines the call type of the second floor participant 300. On determining that the call type of the second floor participant 300 is one of emergency or imminent peril, the floor control server 100, at step 812, queues the floor request from first floor participant 200 if queuing is enabled, or denies floor request from first floor participant 200 if queuing is not enabled.

On determining that the call type indicated in the floor request message is emergency, at step 816, the floor control server 100, determines whether the call type of the second floor participant 300 is emergency. On determining that the call type of the second floor participant 300 is not emergency, the floor control server 100, at step 814, overrides the second floor participant 300 and grants the floor to the first floor participant 200.

At step 808, step 810 and step 816, on determining that the call types of both the first floor participant 200 and the second floor participant 300 are the same, the floor control server 100 checks for other attributes i.e., the user priority, participant type and floor priority to decide the effective priority of the floor requests.

At step 818, the floor control server 100 determines if participant type hierarchy is available for at least one of the first floor participant 200 and the second floor participant 300. On determining that the participant type hierarchy is not available for the first floor participant 200 and the second floor participant 300, the floor control server 100 can be configured to detect the user priority and the floor priority information associated with the first floor participant 200 and the second floor participant 300.

On determining that the participant type hierarchy is available for at least one of the first floor participant 200 and the second floor participant 300, the floor control server 100, at step 820, determines whether the participant type hierarchy is available for both the floor participants. On determining that the participant type hierarchy is available only for the first floor participant 200, the floor control server 100 overrides the second floor participant 300 and grants the floor to first floor participant 200. On determining that the participant type hierarchy is available only for the second floor participant 300, the floor control server 100 queues the floor request from first floor participant 200 if queuing is enabled, or denies the floor request if queuing is not enabled On determining that the participant type hierarchy is available for both the floor participants, at step 822, the floor control server 100, compares the participant type hierarchy of both the first floor participant 200 and the second floor participant 300. On determining that the second floor participant 300 precedes first floor participant 200, the floor control server 100 queues the floor request from first floor participant 200 if queuing is enabled, or denies the floor request if queuing is not enabled. On determining that the first floor participant 200 precedes second floor participant 300, the floor control server 100 overrides the second floor participant 300 and grants the floor to the first floor participant 200. If the floor control server 100 determines that the participant type hierarchy of both the first floor participant 200 and the second floor participant 300 are the same, the floor control server 100 can be configured to detect the user priority and the floor priority information associated with the first floor participant 200 and second floor participant 300.

Referring to FIG. 8B, at step 824, the floor control server 100 determines whether the user priority is available for the first floor participant 200. On determining that the user priority is available for the first floor participant 200, at step 826, the floor control server 100 determines whether the user priority is available for the second floor participant 300. On determining that the user priority is not available for the second floor participant 300, the floor control server 100, at step 814, overrides the second floor participant 300 and grants the floor to the first floor participant 200. On determining that the user priority is available for both the first floor participant 200 and the second floor participant 300, the floor control server 100, at step 828, compares the user priority of both the floor participants. On determining that the user priority of the first floor participant 200 is lower than the user priority of the second floor participant 300, the floor control server 100, at step 812, queues the floor request from the first floor participant 200 if queuing is enabled, or denies the floor request if queuing is not enabled.

On determining that the user priority of the first floor participant 200 is higher than the user priority of the second floor participant 300, the floor control server 100, at step 814, overrides the second floor participant 300 and grants the floor to the first floor participant 200. On determining that the user priority of the first floor participant 200 is same as the user priority of the second floor participant 300, the floor control server 100, can be configured to detect the participant type and the floor priority information associated with the first floor participant 200 and second floor participant 300.

At step 832, the floor control server 100 checks if the floor request message sent by the first floor participant 200 has the floor priority field. On determining that the floor request message doesn't have the floor priority field, the floor control server 100, at step 812, queues the floor request message from the first floor participant 200 if queuing is enabled, or denies the floor request if queuing is not enabled. On determining that the floor request message has the floor priority field, the floor control server 100, at step 834, determines whether the floor priority of the first floor participant 200 is greater than the floor priority of the second floor participant 300. On determining that the floor priority of the first floor participant 200 is greater than the floor priority of the second floor participant 300, the floor control server 100, at step 814, overrides the second floor participant 300 and grants the floor to the first floor participant 200. On determining that the floor priority of the first floor participant 200 is not greater than the floor priority of the second floor participant 300, the floor control server 100, at step 812, queues the floor request from the first floor participant 200 if queuing is enabled, or denies the floor request if queuing is not enabled.

As seen in FIG. 5, FIG. 6, FIG. 7, FIG. 8A, and FIG. 8B, the order of the attributes i.e., user priority, participant type and floor priority can be altered. In another embodiment, the floor control server 100 can select the least attribute (or, the attribute having the least value) among the attributes to determine the effective priority.

Figure 9A:
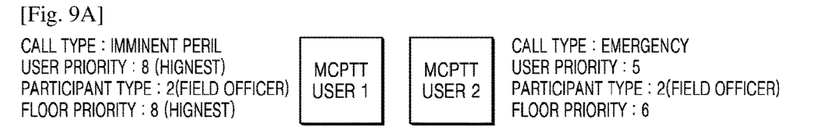
FIGS. 9A through 9C illustrates various scenarios for managing the floor request based on an effective priority, according to an embodiment as disclosed herein.
Figure 9B:
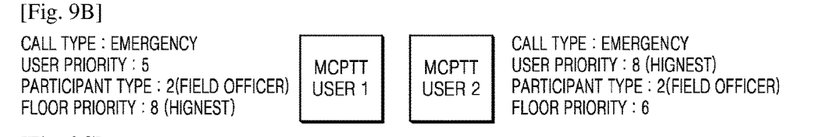
Figure 9C:
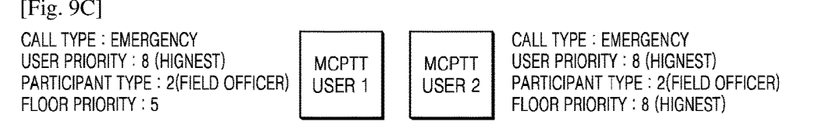

FIGS. 9A through 9C illustrate various scenarios for managing the floor request based on the effective priority, according to an embodiment as disclosed herein.

Referring to FIG. 9A, an example consider a scenario wherein the floor request is received from the first floor participant 200 i.e., MCPTT User-2 when the second floor participant 300 has already engaged the floor i.e., MCPTT User-1 is the current floor arbitrator.

TABLE 1

| Input Parameters | MCPTT User-1 | MCPTT User-2 |
| --- | --- | --- |
| Call type | Emergency | Imminent peril |
| User priority | 5 | 8 (highest) |
| Participant type | 2 (field officer) | 2 (field officer) |
| Floor priority | 6 | 8 (highest) |

In an embodiment, the MCPTT User-2 makes the floor request to the floor arbitrator (i.e., the floor control server 100). Firstly, the floor arbitrator determines the type of call of MCPTT User-2 as imminent peril as indicated in the floor indicator field of the floor request message. Secondly, the floor arbitrator determines the type of call of MCPTT User-1 as emergency. On determining that the ongoing call of MCPTT User-1 is emergency call, the floor arbitrator either queues up the floor request from MCPTT User-2, if queuing is enabled, or denies the floor request to MCPTT User-2 if queuing is not enabled.

Referring to FIG. 9B, an example consider a scenario wherein the floor request is received from MCPTT User-2 when MCPTT User-1 has already engaged the floor i.e., MCPTT User 1 is the current floor arbitrator.

The various input parameters of MCPTT User-1 and MCPTT User-2 are presented in Table 2:

TABLE 2

| Input Parameters | MCPTT User-1 | MCPTT User-2 |
| --- | --- | --- |
| Call type | Emergency | Emergency |
| User priority | 8 (highest) | 8 (highest) |
| Participant type | 2 (field officer) | 2 (field officer) |
| Floor priority | 8 (highest) | 6 |

In an embodiment, the MCPTT User-2 makes the floor request to the floor arbitrator (i.e., the floor control server 100). Firstly, the floor arbitrator determines the type of call of MCPTT User-2 as emergency. Secondly, the floor arbitrator determines the type of call of MCPTT User-1 also as emergency. On determining that the type of call of both the users is the same i.e., emergency, the floor arbitrator checks for other attributes like user priority, participant type and floor priority. On determining that user priority and participant type are also equal for both the MCPTT users, the floor arbitrator checks for the floor priority attribute. Further, the floor arbitrator determines that the floor priority of MCPTT User-1 is 8 and the floor priority of MCPTT User-2 is 6. On determining that the floor priority of MCPTT User-1 is greater than that of MCPTT User-2, the floor arbitrator either queues the floor request of MCPTT User-2 if queuing is enabled or denies the floor request of MCPTT User-2 if queuing is not enabled. The MCPTT User-1 with greater floor priority continues to use the floor.

Referring to FIG. 9C, an example consider a scenario wherein the floor request is received from MCPTT User-2 when MCPTT User-1 has already engaged the floor i.e., MCPTT User-1 is the current floor arbitrator.

The various input parameters of MCPTT User-1 and MCPTT User-2 are presented in Table 3:

TABLE 3

| Input Parameters | MCPTT User-1 | MCPTT User-2 |
| --- | --- | --- |
| Call type | Emergency | Emergency |
| User priority | 8 (highest) | 8 (highest) |
| Participant type | 2 (field officer) | 2 (field officer) |
| Floor priority | 5 | 8 (highest) |

In an embodiment, the MCPTT User-2 makes the floor request to the floor arbitrator (i.e., the floor control server 100). The floor arbitrator determines the type of call of MCPTT User-2 is emergency and the type of call of MCPTT User-1 also is emergency. On determining type of call of both the users is the same i.e., emergency, the floor arbitrator checks for other attributes like user priority, participant type and floor priority. On determining that user priority and participant type are also equal for both the users, the floor arbitrator checks for the floor priority attribute. The floor priority of MCPTT User-1 is determined to be 5 and that of MCPTT User-2 is 8. On determining that the floor priority of MCPTT User-2 is greater than that of MCPTT User-1, the floor arbitrator overrides the current call of MCPTT User-1, and grants the floor to MCPTT User-2, as the floor priority of MCPTT User-2 is greater than the floor priority of MCPTT User-1.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method of a floor control server for managing a floor request in a mission critical push to talk (MCPTT) service, the method comprising:
receiving a floor request message from a first floor participant;
determining an effective priority of the floor request message based on at least one of input parameters of the floor request message and at least one of input parameters of a second floor participant to which a floor is currently granted, wherein the input parameters of the floor request message and the input parameters of the second floor participant comprise at least one of a floor priority parameter, a participant type parameter, or a call type parameter; and
determining whether to grant a floor to the first floor participant based on the effective priority of the floor request message,
wherein the floor request is granted in case that the call type parameter of the floor request message indicates an emergency call type and the call type parameter of the second floor participant indicates an imminent-peril call type or a normal call type,
wherein the floor request is queued or denied in case that the call type parameter of the floor request message indicates the normal call type and the call type parameter of the second floor participant indicates the imminent-peril call type or the emergency call type,
wherein the floor request is granted in case that the call type parameter of the floor request message indicates the imminent-peril call type and the call type parameter of the second floor participant indicates the normal call type, and
wherein the floor request is queued or denied in case that the call type parameter of the floor request message indicates the imminent-peril call type and the call type parameter of the second floor participant indicates the emergency call type.

2. The method of claim 1, wherein the call type parameter of the floor request message is indicated by a floor indicator field of the floor request message, and
wherein the call type parameter comprises the normal call type, the imminent-peril call type, or the emergency call type.

3. The method of claim 2, wherein determining the effective priority further comprises:
checking presence of a floor priority field of the floor request message, the floor priority field including a value of the floor priority parameter; and
determining whether a floor priority of the floor request message is greater than a floor priority of the second floor participant, in case that the floor priority field is present.

4. The method of claim 1, wherein the floor request is queued in case that queuing of the floor request is enabled, or the floor request is denied in case that the queuing of the floor request is disabled.

5. A floor control server for managing a floor request in a mission critical push to talk (MCPTT) service, the floor control server comprising:
a transceiver; and
at least one controller coupled to the transceiver and configured to:
receive a floor request message from a first floor participant,
determine an effective priority of the floor request message based on at least one of input parameters of the floor request message and at least one of input parameters of a second floor participant to which a floor is currently granted, wherein the input parameters of the floor request message and the input parameters of a second floor participant comprise at least one of a floor priority parameter, a participant type parameter, or a call type parameter, and
determine whether to grant a floor to the first floor participant based on the effective priority of the floor request message,
wherein the floor request is granted in case that the call type parameter of the floor request message indicates an emergency call type and the call type parameter of the second floor participant indicates an imminent-peril call type or a normal call type,
wherein the floor request is queued or denied in case that the call type parameter of the floor request message indicates the normal call type and the call type parameter of the second floor participant indicates the imminent-peril call type or the emergency call type,
wherein the floor request is granted in case that the call type parameter of the floor request message indicates the imminent-peril call type and the call type parameter of the second floor participant indicates the normal call type, and
wherein the floor request is queued or denied in case that the call type parameter of the floor request message indicates the imminent-peril call type and the call type parameter of the second floor participant indicates the emergency call type.

6. The floor control server of claim 5, wherein the call type parameter of the floor request message is indicated by a floor indicator field of the floor request message, and
wherein the call type parameter comprises the normal call type, the imminent-peril call type, or the emergency call type.

7. The floor control server of claim 6, wherein the at least one controller is further configured to:
check presence of a floor priority field of the floor request message, the floor priority field including a value of the floor priority parameter; and
determine whether a floor priority of the floor request message is greater than a floor priority of the second floor participant, in case that the floor priority field is present.

8. The floor control server of claim 5, wherein the floor request is queued in case that queuing of the floor request is enabled, or the floor request is denied in case that the queuing of the floor request is disabled.

* * * * *